Patented July 9, 1946

2,403,757

UNITED STATES PATENT OFFICE 2,403,757

PROCESS OF ISOMERIZING DIALKYL BENZENES

Edward D. Reeves, Cranford, N. J., assignor to Standard Oil Development Company, a corporation of Delaware No Drawing. Application August 18, 1943, Serial No. 499,117

10 Claims. (Cl. 260—668)

The present invention relates to the isomerization of aromatic hydrocarbons and pertains more particularly to the catalytic isomerization of ortho substituted dialkyl benzenes.

It has been known that ortho xylene and other corresponding ortho substituted dialkyl benzenes could be isomerized to meta and para forms using aluminum chloride as the catalyst and, if desired, hydrogen chloride as the promoter. It has also been known in the past to isomerize and disproportionate such ortho dialkyl benzenes under temperatures of the order of 1300° F. to 1420° F. in the absence of any catalyst. These methods are, however, disadvantageous for several reasons. In the first instance, where aluminum chloride is employed, the catalyst is generally not recoverable and considerable amounts of feed stock were lost due to reaction with the catalyst to form complexes with aluminum chloride. Furthermore, by the complex formation over an extended period of time, large losses of aluminum chloride occurred for the same reason. This, of course, necessitates replacement of the catalyst mass with aluminum chloride or the complete shutdown of a unit while fresh catalyst mass is substituted for the spent mass. In the case of the thermal isomerization of ortho xylene or other ortho substituted dialkyl benzene, the fuel requirements and the demand for special alloy steel capable of withstanding high temperatures and pressures necessitate the expenditure of large sums of money, and from the economic standpoint such a process is not particularly desirable where commercial scale operations are contemplated.

It is an object of the present invention to carry out the isomerization and disproportionation of ortho dialkyl benzenes to produce the corresponding meta and para isomers in the presence of novel catalyst compositions. It is a further object of the invention to obtain substantial amounts of meta and para dialkyl benzenes by the isomerization and disproportionation of the corresponding ortho dialkyl benzenes through the use of novel catalyst masses which are relatively stable during the isomerization and are recoverable for regeneration and reuse in the process. It is a further object of the invention to conserve feed stock and to prevent disintegration and degradation of the feed stocks and catalysts employed in the isomerization and disproportionation of ortho dialkyl benzenes to form the corresponding meta and para forms thereof. Other objects will be apparent upon a fuller understanding of the invention herein described.

The present invention resides in the preparation of novel catalyst compositions which, upon being used in the heretofore-mentioned isomerization reaction, obviate the difficulties heretofore encountered in the known processes. Where a liquid or vapor phase feed stock predominating in or composed solely of ortho dialkyl benzenes is fed at a temperature between about 500° F. and about 1150° F., at a throughput of between about 0.4 and 6.0 liquid volumes of feed per volume of catalyst mass per hour, in contact with a novel catalyst composition which may comprise a synthetic alumina-silica catalyst mass, sufficient superatmospheric pressures are employed within the lower portion of this range, that is, at a temperature below 650° F. to maintain liquid phase operation if desired. Superatmospheric pressures may also be employed where vapor phase reaction is contemplated, generally the pressure amounting to from 1.5 to 10 atmospheres. The novel catalyst mass may be prepared in a number of various ways. Thus, for example, a silica gel may first be formed by acidifying a dilute solution of sodium silicate with a moderate excess of an acid such as hydrochloric acid whereby a desired silica hydrogel is obtained. This may then be filtered and washed to remove the sodium ions therefrom, after which the gel may be washed with ammonia to free it of acid ions and thereafter heated to a relatively low temperature to evaporate the water. During the final stages of heating, however, the temperature is gradually raised to a temperature of 800° F. and maintained at that temperature for a period of 3 hours to effect the final drying of the silica gel. This procedure is described in the Patrick Patent No. 1,297,794. To this silica gel produced in accordance with this method or any other suitable method there is added alumina either as a gelatinous precipitate of aluminum hydroxide, as alumina hydrogel, alumina hydrosol or alumina gel, or Activated Alumina, and the mixture is commingled with heating to produce the final dried product which serves as the catalyst in the present reaction. A homogenization treatment of the silica and alumina may be employed if the hydrogel of alumina and the hydrogel of silica are first mixed together then homogenized and finally dried to remove the water contained therein. A suitable catalyst composition for use in the present reaction contains about 87.5 weight per cent of silica gel and about 12.5 weight per cent of alumina. The mass may contain a total of 15% water but in general a smaller percentage is desirable.

The catalyst may also be prepared in accordance with the procedure outlined in U. S. application No. 233,159, filed October 4, 1938, in which a mixture of silica and alumina is formed by combining the alumina with silica while the latter is in hydrous form and thereafter dehydrating the hydrous silica.

A still further method for the preparation of catalyst compositions useful in carrying out the process of the present invention resides in the impregnation of silica gel with a dry powdered alumina while the silica gel is in the form of hydrogel and thereafter converting the said hydrogel into a dry gel. A still further method of preparing the novel catalyst composition resides in impregnating a silica gel with an aluminum compound capable of being decomposed either by heat or by chemical reaction into the oxide such as, for example, aluminum nitrate, aluminum chloride or aluminum acetate, followed by the suitable treatment to reduce the compound to the aluminum oxide in situ. A solution of aluminum sulfate may be added to a silica gel either in the form of the hydrosol or as the dried gel. The resulting mixture may then be soaked with ammonium hydroxide to precipitate the aluminum hydroxide. The mixture then is washed free of acid and base ions and calcined at a temperature of around 800° F. to give the required catalyst. Upon using aluminum nitrate, acetate or chloride, the oxide is derived therefrom merely by heating the mass without resorting to the use of ammonium hydroxide to convert it to the aluminum oxide first. Plural gels of alumina and silica, wherein both are formed simultaneously in admixture with each other, are contemplated as well.

Other methods of preparing the catalyst are likewise known. However, the invention is not limited to any specific method for preparing the mixed silica-alumina catalyst mass. In general, the mass may contain from 2:1 to as high as 10:1 mols of silica per mol of alumina, although molar ratios outside of this range may likewise be employed without appreciably affecting the efficiency of the catalyst for isomerizing the ortho dialkyl benzenes, as more fully hereinafter described.

In addition to the use of catalysts composed exclusively of silica and alumina as above described, the invention also contemplates the use of catalysts containing, in addition to the silica and alumina, small amounts of metal oxides such as magnesia, thoria, zirconia and the oxide of boron. These catalysts may be prepared by the addition of the corresponding nitrates, acetates or hydroxides of these metals to the hydrogels followed by the addition of ammonium hydroxide to obtain a mixed mass of hydrated alumina and/or hydrated silica coupled with hydrated thoria, hydrated zirconia, hydrated boron oxide or hydrated magnesia. The resultant admixture is filtered and dried and after drying to a temperature of from 300° F. to 400° F. at first, and finally at a temperature of 800° F. to 900° F., the resultant catalyst mass is ready for use. The percentage of the various metal oxides other than the silica and alumina present in the catalyst mass may range between about 3% and 10% based on the silica-alumina present, although percentages outside of these ranges may be employed if desired.

As previously stated, the resultant catalyst mass is employed in carrying out the isomerization of the ortho dialkyl benzenes by a combined isomerization and disproportionation reaction to produce the corresponding meta and para dialkyl benzenes. Feed stocks which are suitable for use in the reaction comprise any one or more of the following substances: ortho xylene; 2-ethyl toluene; 1,2-diethyl benzene; 2-n-propyl toluene; 2-isopropyl toluene, and similar $C_8$, $C_9$ and $C_{10}$ aromatic ortho dialkyl benzene fractions. These may be obtained for use in the present process through the recovery of ortho xylene concentrates or $C_9$ aromatic fractions obtained in the catalytic hydroforming of petroleum fractions, or the feed stock may also be obtained from selected fractions of the required boiling ranges obtained in coal tar distillations. The ortho xylene concentrate may be easily isolated from the hydroformed product by efficient fractional distillation as may the $C_9$ aromatic fraction which usually contains substantial amounts of ortho dialkyl benzenes. Also suitable feed stocks are obtainable by taking the selected cuts and fractions of aromatic type from products obtained in the catalytic cracking of petroleum refinery fractions. The process finds its greatest utility at the present time in using the heretofore-mentioned feed stocks. It is recognized, however, that the isomerization reaction involves the attainment of an equilibrium and that the process is also applicable to the isomerization of meta and/or para dialkyl benzenes to produce the corresponding ortho isomers thereof. Thus, too, a meta substituted type of feed stock yields ortho and para isomers; a para type yields ortho and meta isomers.

In general, the temperature lies between about 500° F. and about 1150° F., although it is preferred to operate between about 750° F. and about 1025° F. In general, the throughput rate is between about 0.4 and about 6.0 liquid volumes of feed stock per volume of catalyst per hour, but preferably the rate of throughput lies between about 0.6 and about 4 liquid volumes of feed stock per volume of catalyst per hour. The process of the present invention is readily adaptable to commercial operations involving a continuous vapor phase operation in which the vaporized feed stock is passed through a bed of catalyst mass maintained under the required reaction conditions. This catalyst mass may be maintained on stream for between about 1 hour and about 20 hours, preferably between about 2 and about 12 hours, after which it is removed from the reaction and the catalyst mass is subjected to a short regeneration treatment involving 1 to 5 hours, preferably between about 2 and about 3 hours, wherein air or any other gas containing free or uncombined oxygen in dilute form is passed therethrough for a sufficient length of time and under controlled temperature such that the carbonaceous impurities are burned from the pores of the catalyst mass within the time required, after which the regenerated catalyst may be again placed on stream for effecting and activating the isomerization reaction. One of the chief advantages of the present process resides in the fact that the need for regeneration of the catalyst mass at frequent intervals is unnecessary because even at the relatively high operating temperatures the coke formed on the catalyst mass is of the order of 0.6 weight per cent while maintaining an ortho xylene conversion of 60% or better. The process is readily adaptable for combination with other petroleum refining operations regardless of whether or not the present operation is carried out using a catalyst involving a fixed bed, a moving bed or a fluid catalyst type of technique.

The process may be worked in conjunction with those processes previously mentioned which provide the source of ortho xylene or other ortho dialkyl aromatics, such as hydroforming or catalytic cracking, and the process is particularly designed for use in combination with a catalytic cracking operation since the same type of catalyst may be used in both operations at substantially the same temperatures and a single or common regenerator may be employed in the fluid catalyst technique common for both the catalytic cracking operation and the isomerization reaction, the regenerated catalyst being fed to each of the two units from a common source and the spent catalyst from each of the two units being fed to a common regenerator for treatment with air or other free-oxygen-containing gas as heretofore described.

The synthetic alumina-silica catalyst may be employed not only in the form of granules of highly porous structure but it may be first pilled with graphite or starch and regenerated to render it even more highly porous, or the catalyst may be pilled with graphite or starch and used fresh in the on-stream operation without first regenerating the same, although it is preferred to regenerate the catalyst if in the pilling operation either graphite or starch has been added as a cohesion agent.

A series of experimental runs were made to determine the reaction variables employed from which a number of observations can be made. At a given throughput the temperature maintained in the reaction zone has a pronounced effect on the conversion. For example, by increasing the temperature from 750° F. to 975° F. while maintaining 0.6 liquid volume of feed per volume of catalyst per hour the conversion was increased from 44% of the ortho xylene to 77% thereof. This is illustrated in the following table:

| Temperature, °F. | Weight per cent conversion at the indicated feed rate | | | |
|---|---|---|---|---|
| | 0.6 | 1.8 | 3.0 | 4.0 |
| 800 | 52.5 | | | |
| 900 | 68 | 57.5 | 50 | |
| 1,000 | 79 | 70 | 62 | 52.5 |

It is observed that at a given temperature the conversion decreases with increasing feed rate. Thus, at 1000° F. the conversion drops from 79% to 52.5%, while the liquid volume of feed stock per volume of catalyst per hour is increased from 0.6 to 4.0. In general, if reaction occurs, the final product in connection with the isomerization and disproportionation of ortho xylene has the following weight per cent composition:

|  | Weight per cent |
|---|---|
| Ortho xylene | 34 |
| Meta xylene | 49 |
| Para xylene | 12 |
| Ethyl benzene | 5 |

The feed stock employed in this particular series of runs had the following composition:

|  | Weight per cent |
|---|---|
| Ethyl benzene | 0 |
| Para xylene | 0–1 |
| Meta xylene | 6.5–7 |
| Ortho xylene | 84–87.5 |
| Total aromatics | 91–95 |

The purest product, so far as the production of meta and para xylenes are concerned, was obtained when the per cent of ortho xylene undergoing reaction (conversion) was about 40%. This gave a selectivity of about 98. By selectivity is meant the percentage of ortho xylene converted to meta and para xylenes and ethyl benzene. However, the utility of the invention includes the formation of lower boiling aromatics such as toluene or ethyl benzene, the concentration of which is much greater when higher conversion levels are employed. The products need not be segregated into their respective constituents since practically all of them have excellent blending values for use in aviation fuels or in safety fuels.

| Weight per cent conversion | Weight per cent total liquid | | Weight per cent gas | | Weight per cent coke | |
|---|---|---|---|---|---|---|
| | 900° F. | 975° F. | 900° F. | 975° F. | 900° F. | 975° F. |
| 40 | 99.8 | 99.7 | 0.05 | 0.25 | 0.1 | 0.1 |
| 50 | 99.7 | 99.3 | 0.1 | 0.5 | 0.2 | 0.2 |
| 60 | 99.5 | 98.7 | 0.15 | 0.9 | 0.4 | 0.4 |
| 70 | 99.2 | 97.9 | 0.2 | 1.4 | 0.6 | 0.6 |

While higher gas yields are obtained at the higher temperatures, the total liquid recovery is excellent in the entire temperature range shown. The coke formation was so low that it was difficult to determine whether the indicated independence of temperature level was real or was due to an experimental error. It was found also that not only did the selectivity decrease with increasing conversion but that this was not affected by the temperature of the operation, the length of time of on-stream operation of the catalyst or the throughput of the feed stock through the catalyst mass. The experimental findings were obtained by passing the vapor of a C8 aromatic fraction having a boiling range of 290–293° F. and of the heretofore-specified composition through a closed reaction tube filled with about 200 cc. of an alumina-silica catalyst whose composition was, roughly, 87.5 weight per cent silica and 12.5 weight per cent alumina. The products were condensed and collected, the product analyzed for constituents ranging in boiling point between about 265° F. and about 295° F. A run carried out at 985° F. with a throughput of 0.6 liquid volume of feed per volume of catalyst per hour for 12 hours produced a product containing 4 weight per cent ethyl benzene, 16 weight per cent para xylene, 49 weight per cent meta xylene and 26 weight per cent unconverted ortho xylene. The yield of the product was about 75% based on the feed stock, with 12% of the product in the benzene range and 3% accounted for by gas and coke produced.

A considerable number of experimental runs were carried out on two-hour reaction periods using a fixed bed of 200 cc. capacity through which the heretofore specifically mentioned feed stock was passed in the vapor phase. The products obtained varied in composition but generally ranged within the following composition:

|  | Weight Per cent |
|---|---|
| Ortho xylene | 26–42 |
| Meta xylene | 31–49 |
| Para xylene | 3–17 |
| Ethyl benzene | 0–5 |
| Total aromatics produced | 93–97 |

The particular percentage of constituents in the final product as heretofore mentioned varies considerably depending upon the specific reaction conditions employed, but in general the product obtained will vary within the heretofore-mentioned ranges. The product may be isolated through fractional distillation means or it may be employed in the form produced directly as a blending agent in aviation or safety fuels. Appreciable amounts of benzene and toluene were obtained where temperatures in the upper range of the heretofore-mentioned temperature ranges were employed with relatively low rates of throughput. Thus, for example, when employing 0.6 volume of feed stock per volume of catalyst per hour while maintaining a temperature of 1025° F. the result was the production of from 20% to 23% of toluene cut based on the ortho xylene fed to the reaction zone. The same run produced, on the same basis, from 3.5% to 6% of a benzene fraction. In a commercial operation, however, the use of a temperature of this order would call for the use of a throughput of from 3 to 3½ liquid volumes of feed stock per volume of catalyst per hour if it were desired to obtain as high a yield as possible of the meta and para xylenes.

Having thus described and illustrated the nature of the invention, what is desired to be secured by Letters Patent is:

1. A process for the isomerization of ortho dialkyl benzenes which comprises contacting a feed stock comprising essentially said ortho substituted dialkyl benzenes at a temperature between about 500° F. and about 1100° F. with a catalyst mass comprising a synthetic alumina-silica gel for a sufficient length of time to form substantial amounts of meta and para isomers, said gel containing at least one oxide taken from the group consisting of boron oxide, thoria, zirconia and magnesia.

2. In a process of catalytically isomerizing 1,2 dialkyl benzenes to form the corresponding 1,3 and 1,4 dialkyl benzenes under isomerization reaction conditions, the improvement comprising catalyzing the said reaction with a catalyst mass comprising a synthetic alumina-silica gel, containing at least one oxide taken from the group consisting of boron oxide, thoria, zirconia and magnesia.

3. A process which comprises isomerizing ortho xylene at a temperature between about 500° F. and about 1100° F. at a throughput of between about 0.4 and about 6.0 liquid volumes of ortho xylene per volume of catalyst mass per hour while in contact with a synthetic alumina-silica mixed gel, containing at least one oxide taken from the group consisting of boron oxide, thoria, zirconia and magnesia.

4. A process which comprises isomerizing a feed stock comprising essentially ortho xylene at a temperature of about 985° F. at a throughput of about 0.6 liquid volume of feed per volume of catalyst per hour while in contact with a catalyst of silica gel containing alumina and at least one oxide taken from the group consisting of boron oxide, thoria, zirconia and magnesia.

5. A process as in claim 4 wherein the feed stock is a C$_8$ aromatic fraction obtained from a catalytic cracking of a petroleum oil.

6. A process as in claim 4 wherein the feed stock is a C$_8$ aromatic fraction obtained from the hydroforming of a petroleum fraction.

7. A process for the production of meta and para xylene which comprises contacting a feed stock comprising essentially ortho xylene at a temperature between about 750° F. and about 1025° F. at a throughput of between about 0.6 and about 4.0 liquid volumes of feed stock per volume of catalyst per hour with a catalyst comprising essentially synthetic alumina-silica gel, containing at least one oxide taken from the group consisting of boron oxide, thoria, zirconia and magnesia.

8. A process as in claim 7 wherein the catalyst mass is employed in the reaction for a period of time between about 6 and about 12 hours and regenerated with a gas containing free or uncombined oxygen for between about 2 and about 3 hours prior to being re-employed for activating the isomerization reaction, and so employing said regenerated catalyst.

9. A process for the production of meta and para dialkyl benzenes which comprises contacting a feed stock comprising essentially the corresponding ortho dialkyl benzenes at a temperature between about 750° F. and about 1025° F. at a throughput of between about 0.6 and about 4.0 liquid volumes of feed stock per volume of catalyst mass per hour with a catalyst comprising essentially synthetic alumina-silica gel, containing at least one oxide taken from the group consisting of boron oxide, thoria, zirconia and magnesia.

10. A process as in claim 9 wherein the catalyst mass is employed in the reaction for a period of time between about 6 and about 12 hours and regenerated with a gas containing free or uncombined oxygen for between about 2 and about 3 hours prior to being re-employed for activating the isomerization reaction, and so employing said regenerated catalyst.

EDWARD D. REEVES.